United States Patent [19]
Naiztat

[11] 4,156,402
[45] May 29, 1979

[54] PORTABLE HARNESS BAG FOR COLLECTION OF SOLID WASTE MATTER

[76] Inventor: Jacob Naiztat, 9215 Avenue A, Brooklyn, N.Y. 11236

[21] Appl. No.: 850,939

[22] Filed: Nov. 14, 1977

[51] Int. Cl.² .............................................. A01K 23/00
[52] U.S. Cl. ........................................................ 119/95
[58] Field of Search .................................. 119/95, 143

[56] References Cited

U.S. PATENT DOCUMENTS

| | | | |
|---|---|---|---|
| 3,786,787 | 1/1974 | Weinberger | 119/95 |
| 3,792,687 | 2/1974 | Ehrman | 119/95 |
| 3,817,217 | 6/1974 | Matuka et al. | 119/95 |
| 3,875,903 | 4/1975 | Sarvary | 119/95 |

FOREIGN PATENT DOCUMENTS 771414  10/1934  France ........................ 119/95

Primary Examiner—Hugh R. Chamblee
Attorney, Agent, or Firm—Lerner, David, Littenberg & Samuel

[57] ABSTRACT

A portable harness bag for collection of waste matter comprising a resilient frame supporting a light-weight bag of thin gauge plastic. A first tie means secures the frame to the hindquarters of the animal while a second tie means encircles the tail of the animal at the base thereof releasably securing the opposite edge of the frame thereto. The bag opening and central portion of the frame are aligned at the hindquarters of the animal to receive and collect solid waste matter. The tie means may be released to remove a filled bag and replace it with a fresh bag.

In an alternative embodiment, the frame is provided with hingedly connected projections serving to releasably secure the bag to the frame when in the operative position.

10 Claims, 6 Drawing Figures

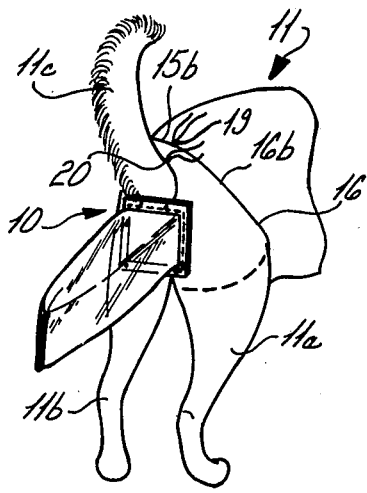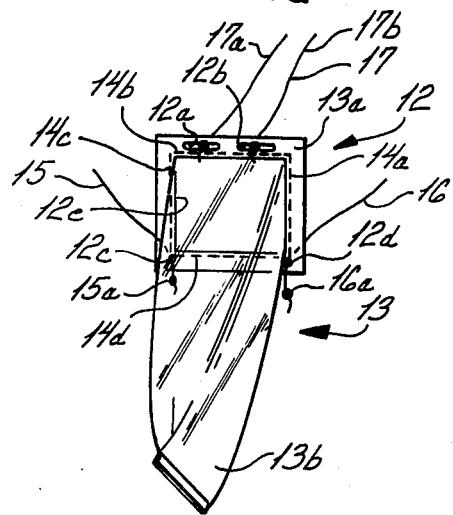

PORTABLE HARNESS BAG FOR COLLECTION OF SOLID WASTE MATTER

BACKGROUND OF THE INVENTION

It is often quite difficult in metropolitan areas when walking a pet to be assured that the pet will not relieve itself of waste matter in areas where it is either undesireable or prohibitive to do so. It thus becomes extremely advantageous to provide a means to enable an animal to pass waste matter without fear of violation of any ordinances and/or concern for the area through which the pet is walked.

BRIEF DESCRIPTION OF THE INVENTION

The present invention is characterized by comprising a frame for securing the open end of a thin gauge light weight plastic bag thereto, said frame having means for securing tie members thereto in order to mount the assembly upon the portion of an animal so as to receive and collect waste matter. The bag may either be releasably mounted upon the frame or may be secured thereto such as by sewing, pressure sensitive adhesive means, suitable epoxy means or by hingedly mounted projections which serve a similar securement function as well as providing the means for securing the tie members thereto.

BRIEF DESCRIPTION OF THE FIGURES AND OBJECTS

It is therefore one object of the present invention to provide a novel waste collector assembly for releasable mounting to the hindquarters of an animal such as a pet dog or cat for simple sanitary collection of solid waste matter by enabling people to walk their pets without fear of violating any local ordinances or creating any unsightly mess.

Still another object of the present invention is to provide a novel solid waste collector assembly for releasable securement to the hindquarters of an animal including a frame means for securing tie means and the open end of a lightweight thin gauge plastic collector bag means.

The above as well as other objects of the present invention will become apparent when reading the accompanying description and drawings in which:

FIGS. 1 and 1a show perspective views of preferred embodiment of the present invention and FIG. 1 shows the manner in which it may be mounted upon the hindquarters of an animal.

FIGS. 2, 3, and 4 show alternative embodiments for the frame member of FIG. 1.

FIG. 3a shows an end view of the frame member of FIG. 3 and the manner of mounting and releasably securing a bag thereto.

DETAILED DESCRIPTION OF THE INVENTION AND THE PREFERRED EMBODIMENTS THEREOF

FIG. 1 shows the hindquarters 11 of an animal and the manner in which the waste collector assembly 10 of the present invention may be mounted thereto.

The waste collector 10, shown best in FIG. 1a, is comprised of a frame 12 and lightweight bag 13 formed of a thin gauge plastic film. The frame is of substantially rectangular shape and is provided with a pair of elongated slots 12a and 12b near its upper end and a pair of circular shaped openings 12c and 12d near its lower left- and right-hand corners respectively.

Bag 13 is provided with an open end 13a and a closed end 13b. The open end 13a extends through the rectangular shaped opening 12e in frame 12 and overlaps the interior marginal portion of the frame to a degree sufficient to overlie the marginal portion and be secured thereto such as by sewn threads arranged along each side as represented by sewn portions 14a–14d. A pair of tie members 15 and 16 are provided, which may for example be strings which are lightweight and yet have an inherent strength sufficient so as not to be ripped apart simply by normal pulling forces exerted upon the string. The lower ends of strings 15 and 16 are knotted at 15a and 16a. The opposite ends of the strings are threaded through openings 12c and 12d respectively and are pulled through the openings so that their knotted ends 15a and 16a rest against the opening without passing therethrough.

A second elongated tie member 17 which may for example be a lightweight string of suitable strength is threaded through elongated openings 12a and 12b so that its free ends extend in the manner shown in FIG. 1a.

The manner in which the assembly 10 is mounted to the hindquarters of the animal 11 as shown in FIG. 1 is as follows:

The tie member 16 is extended between the rear legs 11a and 11b and beneath the rear right leg 11a and is passed around the animal's back. The tie member 15 is similarly passed between the rear legs and beneath the animal's rear left leg 11b and is drawn over the top of the animal's back so that the free ends 15b and 16b may be brought together and knotted at 19.

The free ends 17a and 17b of tie means 17 are drawn about the animal's tail 11c at the base portion thereof so as to be knotted as shown at 20.

The central opening of frame member 12 and the open end of bag 13 are thus arranged at the rear of the hind quarters of the animal in order to receive and collect solid waste matter which may be passed by the animal. Removal of the assembly may be simply accomplished by untying the tie members and removing the assembly from the hindquarters of the animal for simple, safe, sanitary disposal thereof. A fresh assembly may be replaced in the same manner as set forth hereinabove. Since the assembly 10 is so light in weight, it cannot become an annoyance to the animal. Also, since it is able to collect all solid waste matter through its inherent design and physical placement, the activities of the animal are not hampered and the places where the animal may run will be of only minor concern, if any, to the pet owner. The animal will be free to pass any solid waste matter at any locale without the pet owner suffering any needless concern over the fact that the pet may create an unsightly mess or violate a local ordinance which would otherwide be the case in the absence of use of the present invention.

FIG. 2 shows an alternative arrangement for the frame member 12 of FIGS. 1 and 1a wherein the elongated slots 12a and 12b may be replaced by openings 12a' and 12b' if desired. The openings 12a and 12b provide the advantage of accomodating tie member 17 to the hindquarters of an animal and about the tail thereof in instances where the thickness of the tail may vary from animal to animal.

FIG. 3 shows still another embodiment of the member 12 which in FIG. 3 has been designated as 12''. As shown therein, projections 12f'', 12g'' and 12h'' are integrally formed with the frame and are hingedly connected thereto at the bend lines 12j'', 12k'' and 12m'' respectively. All of the projections extend inwardly into opening 12e'' and are provided with suitable openings, projections 12g'' and 12h'' being provided with circular shaped openings 12n'' and 12p'' respectively, and projection 12f'' being provided with elongated slots 12q'' and 12r''.

The manner in which the frame assembly 12'' of FIG. 3 is employed can best be understood from a consideration of FIG. 3a wherein the open end 13a of lightweight plastic bag 13 is extended through the central opening 12e'' and has its free end portions 13c wrapped about the frame so that its marginal portions rest against one surface of the frame.

The projections 12f'' and 12g'' and 12h'' are bent outwardly, FIG. 3 showing the manner in which projections 12j'' and 12k'' are bent, so as to sandwich the free marginal portions of the open end 13a of bag 13 between the projections and the adjacent surface of the frame 12'', i.e., in the regions 13c and 13d.

The slotted openings 12q'' and 12r'' in the same manner as the circular shaped openings 12n'' and 12p'', overlie the outer edges of the frames to allow free passage of the tie members 15, 16 and 17 therethrough. Thus, when the tie members are secured to the animal about the hindquarters of the animals as shown in FIG. 1, the bent-over projections, together with the frame, sandwich the free ends of the bag portion therebetween to secure the bag thereto when in use.

When it is desired to remove a bag and replace the bag with a fresh one, the tie members are simply released, the projections are bent backward in the direction shown by arrows B, C and the bag may be pulled through the center of the frame member for removal and disposal and a new bag may be mounted in the same manner as has been described hereinabove.

The frame member is preferably formed of a lightweight somewhat resilient plastic material having a gauge which, while thin, is significantly greater than the gauge of the plastic bag to maintain the configuration of the assembly at the frame and hence at the bag opening.

FIG. 4 shows an alternative arrangement of the embodiment of FIG. 3 wherein the single integral projection 12f'' is replaced by a pair of intergally joined projections 12t'' and 12u'', each having openings 12v'' and 12w'' similar to the openings 12g'' and 12q'' provided in the projection 12f''. Use of the embodiment of FIG. 4 is substantially similar to that of the embodiment of FIG. 3.

It can therefore be seen that the present invention provides a novel, lightweight, easy to use waste matter collector assembly which is easy to mount and remove, does not cause the animal to suffer any discomfort and which guarantees the pet owner total freedom from any anxieties suffered as a result of the possibility of violation of local ordinances or creating any unsightly mess as a result of the walking of a pet which is especially a problem in metropolitan areas.

Although there has been described herein preferred embodiments of this novel invention, many variations and modifications will now be apparent to those skilled in the art. Therefore, this invention is to be limited, not by the specific disclosure herein, but only by the appending claims. For example, the frame 12 may be provided with a semi-circular recess 12f'' as shown in FIG. 2 for accomodating a portion of the base of the animal's tail, as well as serving to facilitate positioning of the frame upon the animal. The bag and the frame may be made of materials other than plastic, such as paper, fabric, cardboard and the like.

What is claimed is:

1. Means for receiving, collecting and disposing of the solid waste matter of an animal, comprising:
   a frame member having a large central opening, said frame member being formed of a thin resilient, shape-retaining material;
   lightweight bag means formed of a thin gauge flexible material and having a closed end and an open end, the open end of said bag means being permanently secured to said frame member along substantially the entire perimeter of said central opening;
   first tie means secured to a first side of said frame member and being adapted to be passed between the rear legs of an animal and about the lower torso so as to be tied at their free ends at the back of said animal; and
   second tie means secured to a second side of said frame member for encircling the base of the tail of said animal and being tied to one another, said first and second tie means being adapted to releasably secure said frame member to the hindquarters of said animal.

2. The solid waste matter collector means of claim 1 wherein one of said sides of said frame member is provided with a cutaway portion for enhancing the comfort of the animal when wearing said frame member.

3. The waste collector of claim 1 further including means for securing the open end of said bag to said frame member.

4. The solid waste matter collection means of claim 3 wherein said securing means comprises means for sealing said bag to said frame.

5. The solid waste matter collector means of claim 3 wherein said securing means comprises pressure sensitive adhesive means.

6. A device for receiving, collecting and disposing of the solid waste matter of an animal, comprising:
   a frame member having an inner and outer surface and a large central opening;
   bag means formed of thin flexible material and having a closed end and an open end, the open end of said bag means extending through said central opening and around said inner surface and into engagement with said outer surface for securing said bag means to said frame member;
   means hingedly connected to said frame member for securing the marginal open end of said bag means between the outer surface of said frame and said hinge means;
   first tie means secured to said hinge means for passing between the legs of an animal and about the lower torso for securement of said device to said animal; and
   second tie means secured to said hinge means for encircling the base of the tail of the animal, said first and second tie means being operable to releasably secure said frame member to said animal.

7. The solid waste matter collector means of claim 6 wherein said frame member includes a first pair of openings along one side thereof and a second pair of openings in a second side thereof, opposite said first side, said first pair of openings are in the form of circular holes and said second pair of openings are in the form of elongated slots substantially aligned with one another.

8. The solid waste matter collector means of claim 6 wherein said frame member is provided with first projection means integrally joined to said frame member and hingedly connected thereto, said first projection means having said first tie means secured thereto.

9. The solid waste matter collector means of claim 6 wherein said frame member is provided with second projection means integrally joined to said frame member and hingedly connected thereto, said second projection means having said second tie means secured thereto.

10. The solid waste matter collector of claim 8 wherein said second projection means comprises a single elongated projection hingedly connected to said frame member and having first and second elongated slots arranged in side by side fashion for receiving said second tie means.

* * * * *

UNITED STATES PATENT AND TRADEMARK OFFICE
CERTIFICATE OF CORRECTION

PATENT NO. : 4,156,402
DATED : May 29, 1979
INVENTOR(S) : Jacob Naiztat

It is certified that error appears in the above-identified patent and that said Letters Patent are hereby corrected as shown below:

In Figure 3a, the designating numeral "12s" " should read --12q"--.

In Figures 3 and 3a, the designating numeral "12f" " should read --12f'--.

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*